(12) United States Patent
Yang

(10) Patent No.: US 7,324,160 B2
(45) Date of Patent: Jan. 29, 2008

(54) DE-INTERLACING APPARATUS WITH A NOISE REDUCTION/REMOVAL DEVICE

(75) Inventor: Seung-joon Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 10/901,383

(22) Filed: Jul. 29, 2004

(65) Prior Publication Data

US 2005/0110902 A1 May 26, 2005

(30) Foreign Application Priority Data

Nov. 22, 2003 (KR) ...................... 10-2003-0083375

(51) Int. Cl.
*H04N 7/01* (2006.01)

(52) U.S. Cl. ..................................... 348/542

(58) Field of Classification Search ................ 348/452, 348/458, 558, 607, 441, 448, 443, 700, 701; 382/233, 248, 298
See application file for complete search history.

(56) References Cited

U.S. PATENT DOCUMENTS

| | | | |
|---|---|---|---|
| 5,682,205 A | 10/1997 | Sezan et al. | |
| 5,886,745 A | 3/1999 | Muraji et al. | |
| 6,240,211 B1 * | 5/2001 | Mancuso et al. | 382/236 |
| 6,269,484 B1 * | 7/2001 | Simsic et al. | 725/151 |
| 6,348,949 B1 * | 2/2002 | McVeigh | 348/452 |
| 6,509,930 B1 * | 1/2003 | Hirano et al. | 348/452 |
| 6,577,345 B1 | 6/2003 | Lim et al. | |
| 6,606,126 B1 * | 8/2003 | Lim et al. | 348/452 |
| 6,839,094 B2 * | 1/2005 | Tang et al. | 348/607 |
| 7,042,512 B2 * | 5/2006 | Yang et al. | 348/452 |
| 7,057,665 B2 * | 6/2006 | Jung et al. | 348/452 |
| 7,079,159 B2 * | 7/2006 | Yang | 345/684 |
| 7,098,957 B2 * | 8/2006 | Kim et al. | 348/452 |

(Continued)

FOREIGN PATENT DOCUMENTS

CN 1297304 A 5/2001

(Continued)

OTHER PUBLICATIONS

China Office Action dated Mar. 10, 2006 of Chinese Patent Application No. 2004100864787.

(Continued)

*Primary Examiner*—Paulos M. Natnael
(74) *Attorney, Agent, or Firm*—Stanzione & Kim, LLP

(57) ABSTRACT

A de-interlacing apparatus with a noise reduction/removal device. The noise reduction/removal device can include a motion prediction unit that predicts motion vectors between an image one period ahead of a previous image and a current image with respect to individual images which are sequentially inputted; a motion checking unit that applies the motion vectors predicted by the motion prediction unit to the image one period ahead of the previous image and two different images ahead of the current image in time, and checks whether the motion vectors are precise motion vectors; a motion compensation unit that compensates for motions in use of the motion vectors checked for preciseness thereof by the motion checking unit; and a noise removal unit that removes noise on images using the motion-compensated images by the motion compensation unit and the inputted images. Accordingly, the noise reduction/removal device can reduce or remove noise through simple procedures on noise-bearing images.

20 Claims, 3 Drawing Sheets

U.S. PATENT DOCUMENTS

2002/0047919 A1  4/2002  Kondo et al.
2002/0171759 A1  11/2002  Handjojo et al.

FOREIGN PATENT DOCUMENTS

| | | |
|---|---|---|
| CN | 1319995 A | 10/2001 |
| EP | 1 096 791 A2 | 5/2001 |
| JP | 2000-261768 | 9/2000 |
| JP | 2003-274414 | 9/2003 |
| KR | 2001-68516 | 7/2001 |

OTHER PUBLICATIONS

Search Report dated Jun. 27, 2006 of Dutch Patent Application No. 1027270.
Japanese Office Action dated May 29, 2007 issued in JP 2004-335168.

* cited by examiner

DE-INTERLACING APPARATUS WITH A NOISE REDUCTION/REMOVAL DEVICE

CROSS-REFERENCE TO RELATED APPLICATIONS

This application claims the benefit of Korean Patent Application No. 2003-72073 filed Oct. 16, 2003, in the Korean Intellectual Property Office, the disclosure of which is incorporated herein in its entirety.

BACKGROUND OF THE INVENTION

1. Field of the Invention

The present general inventive concept relates to a de-interlacing apparatus with an efficient noise reduction/removal device, and more particularly, to a de-interlacing apparatus with an efficient noise reduction/removal device capable of not only efficiently reducing/removing noise on images but also improving de-interlacing performance on images suffering from severe noise.

2. Description of the Related Art

There mainly exists a progressive scanning format and an interlaced scanning format for moving-picture scanning formats. For the purpose of better understanding, FIG. 1A shows a 30 Hz interlaced scanning (a 60 Hz field frequency) and FIG. 1B shows a 30 Hz progressive scanning.

The progressive scanning is performed with sampled image frames each of which is sampled at the same time, whereas the interlaced scanning is performed with sampled image frames each of which is sampled at a different time, and samplings are repeated on alternate lines. That is, in the interlaced scanning, each image frame is made up of two image fields in general, and the image fields sampled at different times are referred to as a top field and a bottom field, an odd field and an even field, an upper field and a lower field, a first field and a second field, or the like, respectively.

The Moving Picture Experts Group (MPEG) deals with an image as a unit of "one picture (a single view)", and, in MPEG-2, the picture can be reconstructed to frames or fields. That is, a structure of reconstructing a picture to frames is referred to as a "Frame structure" and a structure of reconstructing a picture to fields is referred to as a "Field structure".

Movies use the progressive scanning format which instantly takes and records scenes for views on film one by one and projects the views on the screen one at a time, view by view. On the other hand, TVs use the interlaced scanning format which divides one image frame into two fields and alternately scans the fields in order to display moving pictures effectively while using limited scan lines. In the NTSC color TV systems adopted in the United States, Japan, Korea, and so on, 30 frames each having 525 scan lines are sent per second for a view, and, in the PAL or the SECAM systems adopted in Europe and so on, 25 frames each having 625 scan lines are sent per second, so that the NTSC TVs processes 60 fields per second for a view, and the PAL or the SECOM TVs processes 50 fields per second for a view.

With not only the wide-spreading of the video display devices using the progressive scanning format, but also the increased necessity of data exchanges among the devices using different scanning formats, the need to convert the interlaced scanning format into the progressive scanning format is increasing more than ever. Such scanning format conversion is referred to as de-interlacing, and such a de-interlacing method is used for circumstances in which television signals through skywave broadcasts are converted into signals for computers to display television programs.

FIG. 2 is a view schematically showing a conventional de-interlacing apparatus. Referring to FIG. 2, the de-interlacing apparatus has a memory unit 210, an Motion Estimation/Motion Compensation (ME/MC) unit 220, a weight value calculation unit 230, a spatial axis execution unit 240, and a weight value averaging unit 250.

The memory 210 stores a current field f (k) (including added noise) and a previous field f (k−1) of an image inputted. The ME/MC unit 220 calculates motion vectors v using the current field f (k) (including the added noise) and the previous field f (k−1) that are stored in the memory 210. That is, the ME/MC unit 220 predicts motions using the fields before and after images and decides whether the motions exist. Further, the ME/MC unit 220 calculates a motion-compensated field $f_{mc}$ (k) using the current field f (k) (including the added noise), the previous field f (k−1), and the calculated motion vectors v.

The weight value calculation unit 230 calculates a weight value w for motion adaptation, using the current field f (k) (including the added noise) and the previous field f (k−1). The weight value calculated by the weight value calculation unit 230 is sent to the weight value averaging unit 250.

The spatial axis execution unit 240 carries out spatial axis deinterlacing using the current field f (k) (including the added noise) according to a method for executing the spatial axis deinterlacing, to thereby generate a progressive scan image $f_{sp}$ (k). That is, there exists the method using motion information and the method not using the motion information for the de-interlacing methods, and the spatial axis execution unit 240 carries out the de-interlacing without using motion information. Spatial axis de-interlacing methods include a line averaging method, a weighted median filtering method, an Edge-based line Averaging method, and so on.

The weight value averaging unit 250 performs the de-interlacing with time using the compensated field $f_{mc}$ (k) calculated by the ME/MC unit 220, the weight value w calculated by the weight value calculation unit 230, and the progressive scan image $f_{sp}$ (k) generated by the spatial axis execution unit 240, and generates a progressive scan image g (k) by the de-interlacing performed with time.

In the meantime, the conventional de-interlacing apparatus has a noise reduction device to reduce noise affecting a display for which the apparatus is provided. FIG. 3 shows a conventional noise reduction device. Referring to FIG. 3, the conventional noise reduction device has a memory 310, an ME/MC unit 320, a weight value calculation unit 330, and a weight value averaging unit 340.

The memory 310 stores a progressive scan image g (k−1) including a previous field f (k−1) and the current field f (k) (including the added noise) of an image inputted. The ME/MC unit 320 calculates motion vectors v using the current field f (k) (including the added noise) and the previous field f (k−1) of an image that are stored in the memory 310. That is, the ME/MC unit 320 predicts motions using the fields before and after images, and decides whether the motions exist. Further, the ME/MC unit 320 calculates a motion-compensated field $f_{mc}$ (k) using the previous field f (k−1) and the calculated motion vectors v.

The weight value calculation unit 330 calculates a weight value w for motion adaptation using the current field f (k) (including the added noise) and the previous field f (k−1). The weight value calculated by the weight value calculation unit 330 is sent to the weight value averaging unit 340.

The weight value averaging unit 340 reduces the noise by using the compensated field $f_{mc}$ (k) calculated by the ME/MC unit 320 and the weight value w calculated by the weight value calculation unit 330, and generates a noise-reduced image f'(k) with the noise reduction operations executed.

However, the conventional de-interlacing apparatus and noise reduction device as described above uses the current field f (k) including the added noise for motion predictions all the time, which leads to a high possibility of miscalculating motion vectors v due to the influence of the noise. Accordingly, there exists a problem in that the de-interlacing and noise reduction performance is deteriorated due to the use of miscalculated motion vectors v.

SUMMARY OF THE INVENTION

The present general inventive concept has been developed in order to solve the above drawbacks and other problems associated with the conventional arrangement. An aspect of the present general inventive concept is to calculate precise motion vectors based on images having severe noise thereon so as to improve noise reduction/removal and de-interlacing performance by using the precisely calculated motion vectors.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are substantially achieved by providing a noise reduction/removal device comprising a motion prediction unit that predicts motion vectors between an image one period ahead of a previous image and a current image with respect to individual images which are sequentially inputted; a motion checking unit that applies the motion vectors predicted by the motion prediction unit to the image one period ahead of the previous image and two different images ahead of the current image in time, and checks whether the motion vectors are precise motion vectors; a motion compensation unit that compensates for motions using the motion vectors checked for preciseness thereof by the motion checking unit; and a noise removal unit that removes noise of images using the motion-compensated images from the motion compensation unit and the inputted images.

It is an aspect of the general inventive concept that the motion prediction unit can calculate Sum-of-Absolute-Difference (SAD) values of block units with respect to all vectors in a predicted radius and/or cost functions corresponding to the SAD values, and can predict the motion vectors based on the calculated cost functions.

Further, it is an aspect of the general inventive concept that the motion checking unit can calculate SAD values of block units and/or cost functions corresponding to the SAD values with respect to the image one period ahead of the previous image and the two different images ahead of the current image in time, and can check, based on the calculated cost functions, whether the motion vectors are precise motion vectors.

Further, it is an aspect of the general inventive concept that the motion checking unit can compare the calculated SAD values and/or the cost functions corresponding to the SAD values with SAD values corresponding to multiple motion vectors except for the predicted motion vectors and/or cost functions corresponding to the SAD values, and can check whether the motion vectors are precise motion vectors.

Further, it is an aspect of the general inventive concept that, if the calculated SAD values and/or values of the cost functions corresponding to the SAD values are larger than any of the SAD values of block units corresponding to multiple motion vectors, except for the predicted motion vectors and/or values of the cost functions corresponding to the SAD values, the motion compensation unit can compensate for the motions using any of the multiple motion vectors except for the predicted motion vectors.

Further, it is an aspect of the general inventive concept that the noise removal unit adds weight values of the inputted images and the images compensated by using the motion vectors checked by the motion checking unit, and produces noise-removed images.

The foregoing and/or other aspects and advantages of the present general inventive concept are also substantially achieved by providing a de-interlacing apparatus including a motion prediction unit that predicts motion vectors between an image one period ahead of a previous image and a current image with respect to individual images which are sequentially inputted; a motion checking unit that applies the motion vectors predicted by the motion prediction unit to the image one period ahead of the previous image and two different images ahead of the current image in time, and checks whether the motion vectors are precise motion vectors; a motion compensation unit that compensates for motions using the motion vectors checked for preciseness thereof by the motion checking unit; and a de-interlacing unit that converts an interlaced scanning format into a progressive scanning format using the motion-compensated images from the motion compensation unit and the inputted images.

In an aspect of the general inventive concept, the motion prediction unit calculates Sum-of-Absolute-Difference (SAD) values of block units with respect to all vectors in a predicted radius and/or cost functions corresponding to the SAD values, and predicts the motion vectors based on the calculated cost functions.

Further, it is an aspect of the general inventive concept that the motion checking unit calculates SAD values of block units and/or cost functions corresponding to the SAD values with respect to the image one period ahead of the previous image and the two different images ahead of the current image in time, and checks, based on the calculated cost functions, whether the motion vectors are precise motion vectors.

Further, it is an aspect of the general inventive concept that the motion checking unit compares the calculated SAD values and/or the cost functions corresponding to the SAD values with SAD values corresponding to multiple motion vectors except for the predicted motion vectors and/or cost functions corresponding to the SAD values, and checks whether the motion vectors are precise motion vectors.

Further, it is an aspect of the general inventive concept that, if the calculated SAD values and/or values of the cost functions corresponding to the SAD values are larger than any of the SAD values of block units corresponding to multiple motion vectors, except for the predicted motion vectors and/or values of the cost functions corresponding to the SAD values, the motion compensation unit compensates for the motions using any of the multiple motion vectors except for the predicted motion vectors.

Further, it is an aspect of the general inventive concept that the de-interlacing unit adds weight values of the inputted images and the images compensated by using the motion vectors checked by the motion checking unit, and produces noise-removed images.

Therefore, the de-interlacing apparatus with the noise reduction/removal device according to the present general inventive concept can calculate precise motion vectors based on severe noise-carrying images so as to improve noise reduction/removal and de-interlacing performance using the calculated motion vectors.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
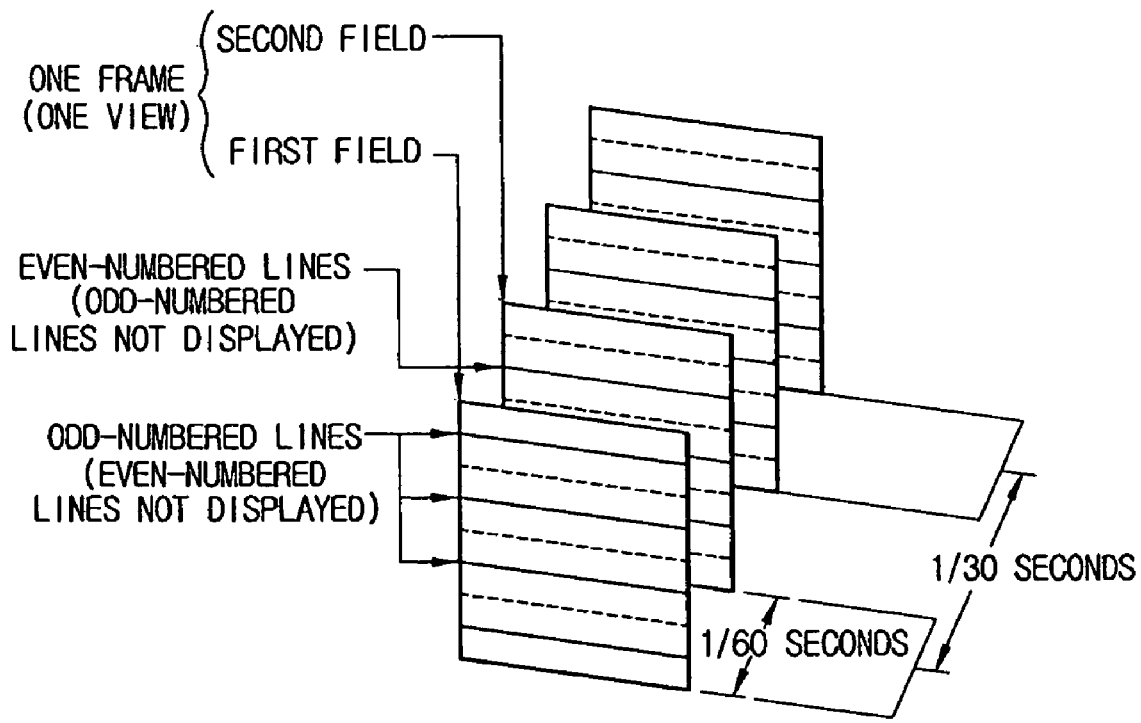
FIG. 1 is a view explaining the general progressive scanning format and the interlaced scanning format.
Figure 1B:
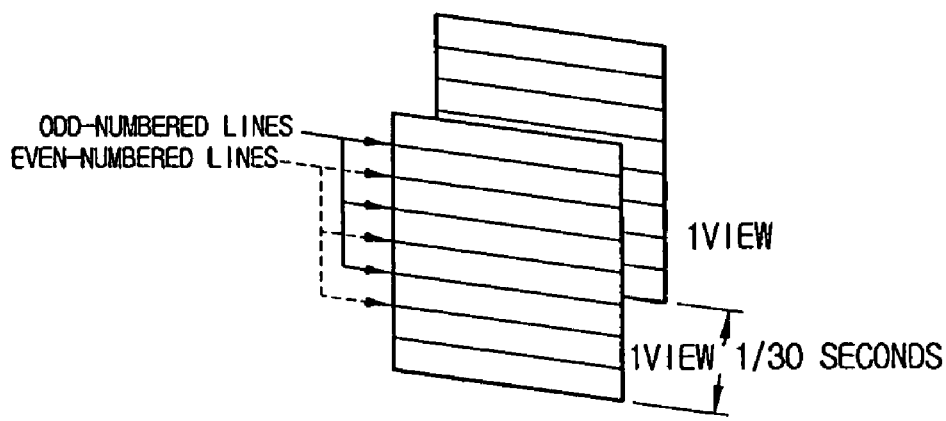
Figure 2:
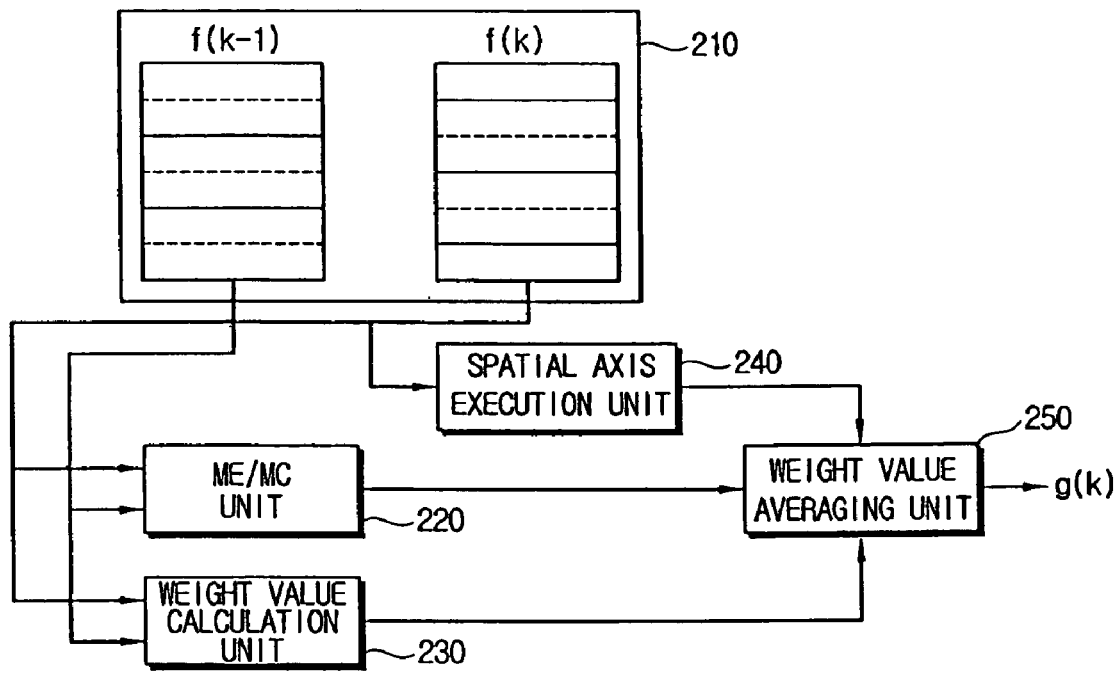
FIG. 2 is a view schematically showing a conventional de-interlacing apparatus.
Figure 3:
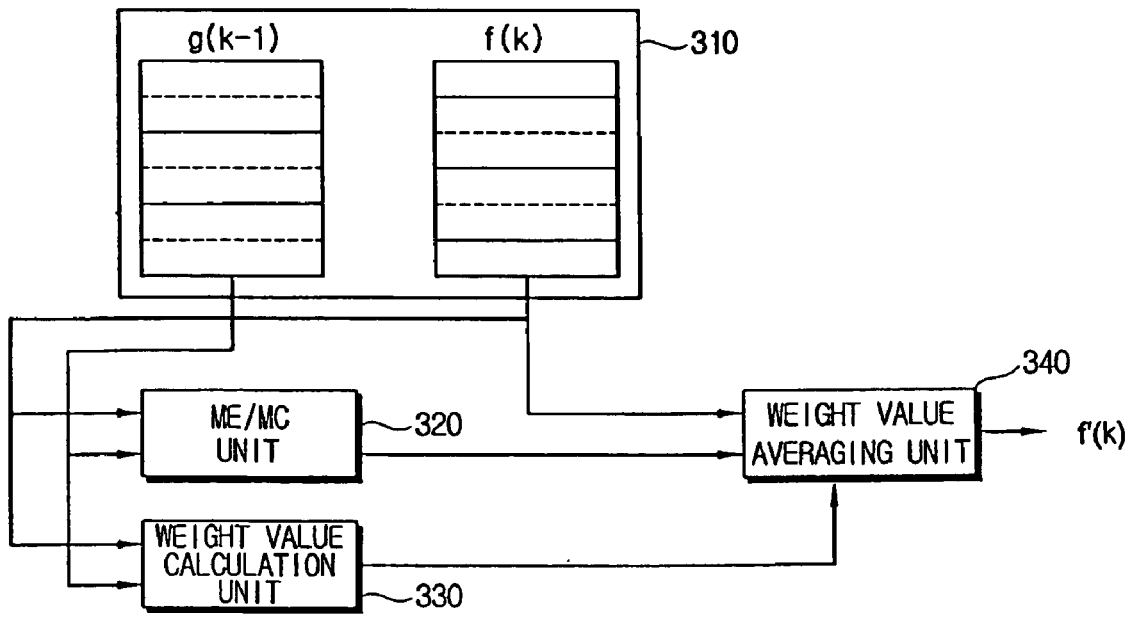
FIG. 3 is a view schematically showing a conventional noise reduction device.

Certain embodiments of the general inventive concept will be described in greater detail with reference to the accompanying drawings. In the following description, same drawing reference numerals are used for the same elements even in different drawings. The matters defined in the description such as a detailed construction and elements are nothing but the ones provided to assist in a comprehensive understanding of the general inventive concept. Thus, it is apparent that the general inventive concept can be carried out without those defined matters. Also, well-known functions or constructions are not described in detail since they would obscure the general inventive concept in unnecessary detail.

Figure 4:
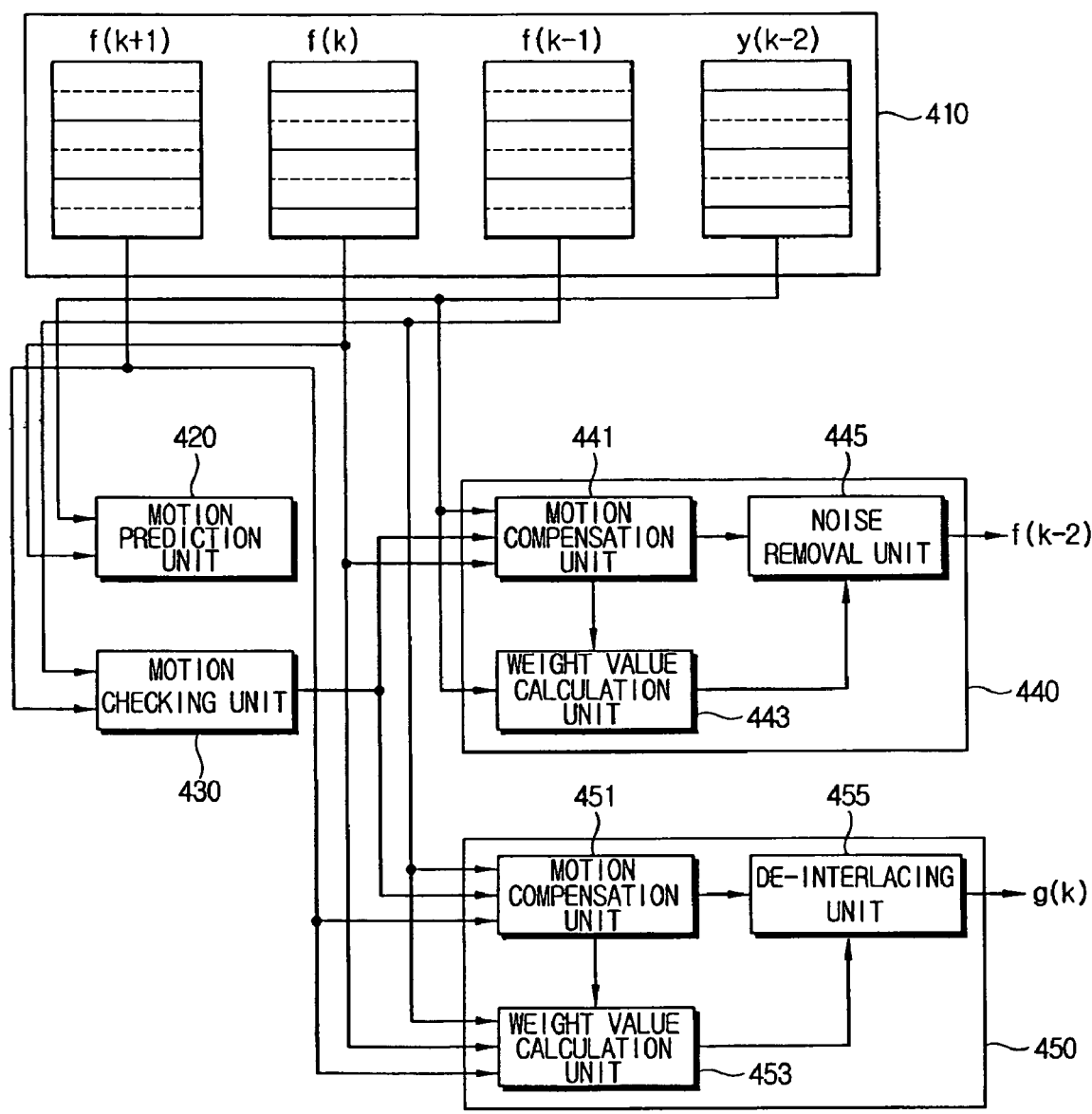
FIG. 4 is a block diagram schematically showing a de-interlacing apparatus with a noise reduction device according to an embodiment of the present general inventive concept.

FIG. 4 is a block diagram schematically showing a de-interlacing apparatus with a noise reduction/removal device according to an embodiment of the present general inventive concept. Referring to FIG. 4, the noise reduction/removal device can have a memory unit 410, a motion prediction unit 420, a motion checking unit 430, and a noise processing unit 440. The noise processing unit 440 can include a motion compensation unit 441, a weight value calculation unit 443, and a noise removal unit 445.

The memory unit 410 stores a current field f (k), a next field f (k+1), a previous field f (k−1), and a pre-previous image y (k−2), of an image inputted. The pre-previous image y (k−2) is a noise-bearing image that obtains noise during image transmissions or processing procedures, which can be expressed in gaussian noise modeling by Equation 1 as follows:

$$y = f + n, \quad \text{[Equation 1]}$$

where y denotes an image on which noise is observed and n denotes gaussian noise.

The motion prediction unit 420 predicts, with respect to individual images sequentially inputted, motion vectors between an image which is one period ahead of a previous image and a current image. The image one period ahead of the previous image is an image with noise-added during the transmissions of the image or the processing procedures of the image. Further, the motion prediction unit 420 calculates a Sum-of-Absolute-Difference (SAD) value of a unit block or a cost function corresponding to the SAD value with respect to all vectors within a predicted radius, and predicts motion vectors based on the calculated cost function.

The motion checking unit 430 applies the motion vectors predicted by the motion prediction unit 420 to the image one period ahead of the previous image and two different images ahead of the current image in time, and checks whether the motion vector predictions are precise. This is to prevent wrong motion vectors from being predicted since motion vectors predicted with respect to the current image and the one-period-ahead image may bring about a poor degree of precision with respect to images suffering from severe noise. It is assumed that the motions last while having a constant velocity.

Provided that motion vectors are predicted with respect to macroblocks each having a size of [bs, bs], a SAD value of the $(m,n)^{th}$ macroblock between $\hat{f}$ (k) and y (k−2) with respect to a given motion vector $v=[v_i, v_j]^t$ can be defined as follows. $\hat{f}$ denotes an original image to which the Infinite Impulse Response (IIR) filter is applied.

$$\Phi(m, n, k; v) = \sum_{(i,j) \in B(m,n,k)} \left| \hat{f}(i+v_i, j+v_j, k) - y(i, j, k-2) \right| \quad \text{[Equation 2]}$$

where B(m,n,k) denotes a set of given pixel coordinates in the $(m,n)^{th}$ macroblock at a $k^{th}$ time axis.

Provided that a predicted motion vector is denoted as $\hat{v}$, the $\hat{v}$ can be expressed as shown in the following Equation 3.

$$\hat{v}(m, n, k) = \arg \min_{v \in S} \Phi(m, n, k; v) \quad \text{[Equation 3]}$$

where, S denotes a set of vectors in a search range. With such a method, the motion checking unit 430 can calculate an SAD value of a unit block or a cost function corresponding to the SAD value with respect to an image one period ahead of a previous image and two different images ahead of a current image in time, and can check, based on the calculated cost function, whether precise motion vectors are obtained. Further, the motion checking unit 430 can compare the calculated SAD value or the cost function corresponding to the SAD value with an SAD value corresponding to the multiple motion vectors except for the predicted motion vectors or a cost function corresponding to the SAD value, and can check whether precise motion vectors are obtained.

The motion compensation unit 441 of the noise processing unit 440 can compensate for motions by using the motion vectors checked for their preciseness by the motion checking unit 430. If the calculated SAD value or a value of the cost function corresponding to the SAD value is larger than at least one of the SAD values of the unit blocks each corresponding to the multiple motion vectors except for the predicted motion vectors or the values of the cost functions corresponding to the SAD values, it is an aspect of the general inventive concept that the motion compensation unit 441 can compensate for motions by using any of the plural motion vectors except for the predicted motion vectors.

The weight value calculation unit 443 can calculate a weight value w for motion adaptation by using the next field f (k+1), the current field f (k), and the previous field f (k−1). The weight value calculated by the weight value calculation unit 443 is sent to the noise removal unit 445.

The noise removal unit 445 can remove the noise of images by using motion-compensated images provided by the motion compensation unit 441 and inputted images. At this time, the noise removal unit 445 can add the weight values of the compensated images and the inputted images by using the motion vectors checked by the motion checking unit 430, and then can produce noise-reduced or noise-removed images. An image f (k−2) output from the noise removal unit 445 denotes a noise-removed image obtained from the noise-bearing image y (k−2).

Thus, the noise removal unit 445 can remove or efficiently reduce noise of noise-bearing images through simple procedures.

In the meantime, the de-interlacing apparatus has the memory unit 410, the motion prediction unit 420, the motion checking unit 430, and a de-interlacing processing unit 450. The de-interlacing processing unit 450 has a motion compensation unit 451, a weight value calculation unit 453, and a de-interlacing unit 455. The constituents of the memory unit 410, the motion prediction unit 420, the motion checking unit 430, the motion compensation unit 451, and the weight value calculation unit 453 are identical to those of the noise removal device, so the constituents are shown in one drawing, and detailed descriptions thereof will be omitted.

The de-interlacing unit 455 can add the weight values of a compensated image and an inputted image by using motion vectors checked by the motion checking unit 430, and then can produce a de-interlacing image. The image g (k) in FIG. 4 denotes a de-interlaced image of the progressive scanning format with respect to an image f (k) of an interlaced scanning format.

Therefore, the de-interlacing apparatus can perform a precise de-interlacing on noise-bearing images.

According to the present general inventive concept, the noise reduction/removal device can reduce/remove noise through simple procedures performed on inputted images, and the de-interlacing apparatus can perform precise de-interlacing with respect to noise-bearing images.

Although the embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A noise reduction/removal device, comprising:
    a motion prediction unit that predicts motion vectors between an image one period ahead of a previous image and a current image with respect to individual images which are sequentially inputted;
    a motion checking unit that applies the motion vectors predicted by the motion prediction unit to the image one period ahead of the previous image and two different images ahead of the current image in time, and checks whether the motion vectors are precise motion vectors;
    a motion compensation unit that compensates for motions using the motion vectors checked for preciseness thereof by the motion checking unit; and
    a noise removal unit that removes noise on images using the motion-compensated images by the motion compensation unit and the inputted images.

2. The noise reduction device as claimed in claim 1, wherein the motion prediction unit calculates Sum-of-Absolute-Difference (SAD) values of block units with respect to all vectors in a predicted radius and/or cost functions corresponding to the SAD values, and predicts the motion vectors based on the calculated cost functions.

3. The noise reduction/removal device as claimed in claim 1, wherein the motion checking unit calculates SAD values of block units and/or cost functions corresponding to the SAD values with respect to the image one period ahead of the previous image and the two different images ahead of the current image in time, and checks based on the calculated cost functions whether the motion vectors are precise motion vectors.

4. The noise reduction/removal device as claimed in claim 1, wherein the motion checking unit compares the calculated SAD values and/or the cost functions corresponding to the SAD values with SAD values corresponding to multiple motion vectors except for the predicted motion vectors and/or cost functions corresponding to the SAD values, and checks whether the motion vectors are precise motion vectors.

5. The noise reduction/removal device as claimed in claim 4, wherein, if the calculated SAD values and/or values of the cost functions corresponding to the SAD values are larger than any of the SAD values of block units corresponding to multiple motion vectors except for the predicted motion vectors and/or values of the cost functions corresponding to the SAD values, the motion compensation unit compensates for the motions using any of the multiple motion vectors except for the predicted motion vectors.

6. The noise reduction/removal device as claimed in claim 5, wherein the noise removal unit adds weight values of the inputted images and the images compensated by using the motion vectors checked by the motion checking unit, and produces noise-removed images.

7. A de-interlacing apparatus, comprising:
    a motion prediction unit that predicts motion vectors between an image one period ahead of a previous image and a current image with respect to individual images which are sequentially inputted;
    a motion checking unit that applies the motion vectors predicted by the motion prediction unit to the image one period ahead of the previous image and two different images ahead of the current image in time, and checks whether the motion vectors are precise motion vectors;
    a motion compensation unit that compensates for motions using the motion vectors checked for preciseness thereof by the motion checking unit; and
    a de-interlacing unit that converts an interlaced scanning format into a progressive scanning format using the motion-compensated images by the motion compensation unit and the inputted images.

8. The de-interlacing apparatus as claimed in claim 7, wherein the motion prediction unit calculates Sum-of-Absolute-Difference (SAD) values of block units with respect to all vectors in a predicted radius and/or cost functions corresponding to the SAD values, and predicts the motion vectors based on the calculated cost functions.

9. The de-interlacing apparatus as claimed in claim 7, wherein the motion checking unit calculates SAD values of block units and/or cost functions corresponding to the SAD values with respect to the image one period ahead of the previous image and the two different images ahead of the current image in time, and checks based on the calculated cost functions whether the motion vectors are precise motion vectors.

10. The de-interlacing apparatus as claimed in claim 7, wherein the motion checking unit compares the calculated SAD values and/or the cost functions corresponding to the SAD values with SAD values corresponding to multiple motion vectors except for the predicted motion vectors and/or cost functions corresponding to the SAD values, and checks whether the motion vectors are precise motion vectors.

11. The de-interlacing apparatus as claimed in claim 10, wherein, if the calculated SAD values and/or values of the cost functions corresponding to the SAD values are larger than any of the SAD values of block units corresponding to multiple motion vectors except for the predicted motion vectors and/or values of the cost functions corresponding to the SAD values, the motion compensation unit compensates for the motions using any of the multiple motion vectors except for the predicted motion vectors.

12. The de-interlacing apparatus as claimed in claim 11, wherein the de-interlacing unit adds weight values of the inputted images and the images compensated by using the motion vectors checked by the motion checking unit, and produces noise-removed images.

13. A de-interlacing apparatus comprising:
a memory to store a sequence of noise-reduced field images and a noise-bearing field image temporally succeeding the sequence;
a motion prediction unit to generate motion vectors between the noise-bearing field image and a noise-reduced field image preceding the noise-bearing field image in the sequence by at least two time intervals;
a motion checking unit to evaluate the generated motion vectors against image motion between at least a noise-reduced field image preceding in the sequence the noise-bearing field image and a noise-reduced field image preceding the noise-bearing field image in the sequence by three time intervals;
a noise processing unit to produce a noise-reduced field image temporally next in the sequence from the noise-bearing field image using a set of motion vectors matching to a predetermined threshold the image motion as evaluated by the motion checking unit; and
a de-interlacing processing unit to produce a progressive scan image from the noise-reduced field image preceding the noise-bearing field image in the sequence by the at least two time intervals using the set of motion vectors.

14. The de-interlacing apparatus as claimed in claim 13, wherein the motion prediction unit generates the motion vectors using a sum-of-absolute-differences between respective pixel blocks in the noise-bearing field image and the noise-reduced field image preceding the noise-bearing field image in the sequence by at least two time intervals.

15. The de-interlacing apparatus as claimed in claim 14, wherein the predetermined threshold in the motion checking unit is the sum-of-absolute-differences in the motion predicting unit.

16. The de-interlacing apparatus as claimed in claim 13, wherein the noise processing unit includes a motion compensating unit to apply the set of motion vectors from the noise-reduced field image preceding the noise-bearing field image in the sequence by at least two time intervals to the noise-bearing field image to produce a motion compensated noise-bearing field image.

17. The de-interlacing apparatus as claimed in claim 16, wherein the noise processing unit includes a weight value calculation unit and a noise removal unit to remove noise from the motion compensated noise-bearing field image using a weight value determined from at least the noise-bearing field image to produce the noise-reduced field image temporally next in the sequence.

18. The de-interlacing apparatus as claimed in claim 13, wherein the de-interlacing processing unit includes a motion compensating unit to apply the set of motion vectors from the noise-reduced field image preceding the noise-bearing field image to the noise-reduced field image preceding the noise-bearing field image by three time intervals to the noise-bearing field image to produce a motion compensated field image.

19. The de-interlacing apparatus as claimed in claim 18, wherein the de-interlacing processing unit includes a weight value calculation unit and a de-interlacing unit to de-interlace the motion compensated field image with a weight value determined from at least the noise-reduced field image preceding the noise-bearing field image in the sequence by at least two time intervals to produce the progressive scan image.

20. The de-interlacing apparatus as claimed in claim 13, wherein the motion checking unit evaluates motion vectors other than the generated motion vectors to arrive at the set of motion vectors when the generated motion vectors are evaluated to be unacceptable with respect to the predetermined threshold.

* * * * *